Patented Dec. 27, 1949

2,492,562

UNITED STATES PATENT OFFICE 2,492,562

SULFURIZATION OF FATTY OILS

Jack S. Fawcett, Tarentum, Pa., assignor to Gulf Research & Development Company, Pittsburgh, Pa., a corporation of Delaware No Drawing. Application April 2, 1948,
Serial No. 18,711

6 Claims. (Cl. 260—399)

This invention relates to an improved process for the sulfurization of fatty oils, and in particular concerns a process whereby fatty oils are reacted with sulfur in the presence of a catalyst.

It is well known that fatty oils of animal or vegetable origin undergo reaction with elemental sulfur to form sulfurized products which find wide use in the manufacture of extreme pressure lubricants such as cutting oils, hypoid gear lubricants, break-in oils and the like. The sulfurization reaction is usually carried out by heating the oil to a temperature of about 325°–375° F. and thereafter adding from about 5 to about 30 per cent by weight of finely-divided sulfur and continuing the heating until the reaction is complete. Such mode of procedure, however, involves heating the oil and sulfur at relatively high temperatures over a long period of time and results in a thickened product of high viscosity, presumably by reason of oxidation or polymerization of the unsaturated constituents of the oil. If it is attempted to obviate this difficulty through the employment of lower reaction temperatures and/or shorter heating periods, the product is characterized by a very dark color and offensive odor, and is unstable upon storage over any substantial period of time. This is considered to be due to the reaction being only partially complete under the milder reaction conditions.

I have now found that through the use of certain catalysts the sulfurization reaction may be effected at lower temperatures and/or in shorter periods of time with consequent improvement in the quality of the sulfurized product. More particularly, I have found that certain amine salts of the complex of boric acid and ethylene glycol catalyze the reaction between fatty oils and sulfur in such manner that substantially complete reaction is attained under relatively mild conditions. The sulfurized products obtained have excellent color, odor, and stability characteristics, and retain their extreme pressure properties. The invention thus consists in the process of reacting fatty oils, such as lard oil, sperm oil, corn oil, cottonseed oil, and the like, with elemental sulfur in the presence of a catalytic amount of an amine salt of the complex of boric acid and ethylene glycol.

The amine salts which are employed as sulfurization catalysts in accordance with the invention are obtained by the direct addition of a primary aliphatic amine containing from 10 to 20 carbon atoms to the complex of boric acid and ethylene glycol, herein termed the "boro-ethylene glycol complex." Such complex may be prepared simply by heating boric acid with two molecular equivalents of ethylene glycol at a temperature of about 100°–200° C. until water is no longer evolved from the mixture. Upon cooling, the complex is obtained as a white powdery solid having a melting point of about 135°–145° C. The molecular structure of this product is not known with certainty, but it is believed to be a chelate-type compound containing at least one acidic hydrogen atom.

The amine salts of the boro-ethylene glycol complex may be prepared by heating a mixture of the complex and a primary aliphatic amine containing from 10 to 20 carbon atoms, e. g., decylamine, laurylamine, tetradecylamine, hexadecylamine, octadecylamine, eicosylamine, etc., to a suitable reaction temperature, e. g. 50°–200° C., until reaction is complete. If desired, the reaction may be carried out in the presence of an inert solvent such as water, benzene, toluene, naphtha, etc. Also, if desired, the amine salts may be prepared directly from boric acid, ethylene glycol, and the desired amine without isolation of the intermediate boro-ethylene glycol complex by heating a mixture of the three reactants, either under anhydrous conditions or in the presence of water.

In sulfurizing fatty oils in accordance with the process of the invention, any of the conventional procedures may be followed. If desired, a mixture of the oil and catalyst may be heated to the desired reaction temperature, and the requisite quantity of sulfur then stirred into the oil and the heating continued until reaction is complete. Alternatively, the fatty oil, sulfur, and catalyst may be mixed together and the mixture then heated with stirring for the requisite reaction period. The sulfurized product is usually filtered before packaging or storage.

As previously mentioned, the use of the catalysts herein disclosed permits either a reduction in the reaction temperature or the reaction time, or both, and results in a product of superior quality. Accordingly, the reaction temperatures employed are usually somewhat lower than those conventionally employed when sulfurizing fatty oils in the absence of a catalyst, although such higher temperatures may be employed when it is desired to effect the reaction in a minimum period of time. Thus, the present process may be carried out at temperatures between about 300° F. and about 350° F. as compared to the temperature range of about 325°–375° F. usually employed in a non-catalytic process. Similarly, the time of reaction is usually less than that required in the non-catalytic process, unless it is desired to effect the reaction at a minimum temperature. Thus, when employing the present process, the reaction is usually complete in from 1 to 3 hours as compared with 3 to 6 hours or more being required by conventional procedure. Accordingly, as a general rule, the present process is usually carried out at temperatures between about 300° F. and about 350° F. over a period of from about 1 to about 3 hours, although some departure from these conditions may be required or permitted depending upon the nature of the fatty oil reactant and the proportion of sulfur employed.

The present process may be employed to introduce sulfur into the fatty oil in amounts ranging from very small percentages to as high as 20-30 per cent by weight or more. The maximum amount of sulfur which may thus be combined with the oil depends upon the nature of the oil. Inasmuch as substantially complete reaction between the sulfur and the oil is effected under permissible reaction conditions through the use of the herein disclosed catalysts, it is not usually necessary to employ any substantial excess of sulfur. Accordingly, the proportions of sulfur and fatty oil will correspond substantially to the proportion of sulfur desired in the sulfurized product. For ordinary uses, e. g., as extreme pressure lubricants or lubricant additives, it is desirable that the sulfurized oil contain from about 5 to about 15 per cent by weight of sulfur, and accordingly the sulfur reactant is usually employed in an amount representing between about 5 and about 15 per cent by weight of the oil, although these proportions may be varied if desired.

The amount of catalyst may likewise be varied depending upon the ease with which the oil reacts with the sulfur, but will usually be between about 0.5 and about 2.0 per cent by weight of the oil.

The following example will illustrate one way in which the principle of the invention has been applied, but is not to be construed as limiting the same. All proportions are by weight.

Example

The hexadecylamine salt of the boro-ethylene glycol complex was prepared as follows: A mixture of 248 parts of ethylene glycol and 123.6 parts of boric acid was placed in a flask and heated at a temperature of about 100° C. for one hour, after which 100 parts of toluene were added and the heating was continued at reflux temperature while collecting water in a water-trap connected to the flask. Approximately 114 parts of water were collected in this manner. When the temperature of the contents of the flask reached about 121° C., the water trap was disconnected and the toluene was distilled off until the temperature reached about 200° C. Upon cooling and standing over night the boro-ethylene glycol complex was obtained as a white powdery solid having a melting point of about 135°-143° C. Approximately 17.1 parts of this product were then mixed with 24.1 parts of hexadecylamine and heated at a temperature of about 150° C. for 20 minutes. The mixture was allowed to cool to about 50° C. and approximately 200 parts of benzene were added. The mixture was then heated at reflux temperature for one hour, after which it was cooled and filtered. The benzene was distilled off and the product was dried in a vacuum oven whereby the hexadecylamine salt of the boro-ethylene glycol complex was obtained as a yellow waxy solid having a melting point of about 60°-69° C.

A mixture of 200 parts of lard oil (extra winter strained grade), 24.4 parts of sulfur, and 2.0 parts of the hexadecylamine salt of the boro-ethylene glycol complex was heated at a temperature of 315° F. for a period of one hour. After cooling, the sulfurized product was examined for odor, color, and stability, and was analyzed for total sulfur content. This product was found to have a good odor and to have a color of 6 Dilute on the NPA color scale. It analyzed 10.07 per cent by weight of sulfur, and upon standing at room temperature for one month, retained its good color and odor and did not show any substantial precipitation.

In contrast to the above, a product prepared by heating 200 parts of lard oil (extra winter strained grade) and 24.4 parts of sulfur at 315° F. for one hour, had a very disagreeable sour odor and was very dark in color. It was so unstable that precipitation and sludging occurred immediately upon cooling. Similarly, a product obtained by heating the same quantities of lard oil and sulfur at 315° F. for 1¾ hours had an unpleasant odor, a color of 8+ Dilute, and showed precipitation after one week's storage at room temperature. A third product prepared by heating the same quantities of lard oil and sulfur at 315° F. for two hours had a noticeably disagreeable odor and a color of 8+ Dilute.

While the foregoing example illustrates the practice of the process of the invention as applied to the sulfurization of lard oil employing the hexadecylamine salt of the boro-ethylene glycol complex as a sulfurization catalyst, it is to be understood that the same general procedure is applicable broadly to the sulfurization of other fatty oils, such as cottonseed oil, corn oil, linseed oil, sperm oil, menhaden oil, whale oil, tung oil, as well as fatty oils which may be solid at ordinary temperatures, such as spermaceti, wool fat, horse fat, tallow, etc., employing as the catalyst a salt of the boro-ethylene glycol complex with any primary aliphatic amine containing from 10 to 20 carbon atoms, e. g. decylamine, laurylamine, tetradecylamine, pentadecylamine, hexadecylamine, octadecylamine, eicosylamine, diethylhexadecylamine, trimethyldodecylamine, isopropyl-decylamine, etc. As previously explained, minor variations in the reaction conditions and procedure herein disclosed may be made to secure optimum results with any particular fatty oil and/or catalyst without departing from the scope of the invention. Such variations will be apparent to those skilled in the art.

Other modes of applying the principle of my invention may be employed instead of those explained, change being made as regards the procedure or ingredients employed, provided the step or steps stated by any of the following claims, or the equivalent of such stated step or steps, be employed.

I, therefore, particularly point out and distinctly claim as my invention:

1. The process for the sulfurization of fatty oils which comprises heating a fatty oil with elemental sulfur in the presence of a catalytic amount of a salt of the boro-ethylene glycol complex and a primary aliphatic amine containing from 10 to 20 carbon atoms.

2. The process for the sulfurization of fatty oils which comprises heating a fatty oil with elemental sulfur at a reaction temperature between about 300° F. and about 350° F. and from about 1 to about 3 hours in the presence of a catalytic amount of a salt of the boro-ethylene glycol complex and a primary aliphatic amine containing from 10 to 20 carbon atoms.

3. The process for the sulfurization of fatty oils which comprises heating a fatty oil with between about 5 and about 15 per cent by weight thereof of elemental sulfur at a reaction temperature between about 300° F. and about 350° F. for from about 1 to about 3 hours in the presence of a catalytic amount of a salt of the boro-ethylene glycol complex and a primary aliphatic amine containing from 10 to 20 carbon atoms.

4. The process for the sulfurization of lard oil which comprises heating lard oil with elemental sulfur at a reaction temperature between about 300° F. and about 350° F. for from about 1 to about 3 hours in the presence of a catalytic amount of a salt of the boro-ethylene glycol complex and a primary aliphatic amine containing from 10 to 20 carbon atoms.

5. The process for the sulfurization of lard oil which comprises heating lard oil with elemental sulfur at a reaction temperature between about 300° F. and about 350° F. for from about 1 to about 3 hours in the presence of a catalytic amount of the hexadecylamine salt of the boro-ethylene glycol complex.

6. The process for the sulfurization of lard oil which comprises heating lard oil with between about 5 and about 20 per cent by weight of elemental sulfur at a reaction temperature between about 300° F. and about 350° F. for from about 1 to about 3 hours in the presence of between about 0.5 and about 2.0 per cent by weight of the hexadecylamine salt of the boro-ethylene glycol complex based on the weight of the lard oil.

JACK S. FAWCETT.

REFERENCES CITED

The following references are of record in the file of this patent:

UNITED STATES PATENTS

| Number | Name | Date |
| --- | --- | --- |
| 2,152,185 | Gottesmann | Mar. 28, 1939 |
| 2,425,597 | Church | Aug. 12, 1947 |
| 2,450,403 | Wells | Sept. 28, 1948 |